(12) United States Patent
Yang

(10) Patent No.: US 7,955,726 B2
(45) Date of Patent: *Jun. 7, 2011

(54) BATTERY MODULE OF HIGH COOLING EFFICIENCY

(75) Inventor: Jae Hun Yang, Daejeon (KR)

(73) Assignee: LG Chem, Ltd. (KR)

(*) Notice: Subject to any disclaimer, the term of this patent is extended or adjusted under 35 U.S.C. 154(b) by 0 days.

This patent is subject to a terminal disclaimer.

(21) Appl. No.: 12/846,251

(22) Filed: Jul. 29, 2010

(65) Prior Publication Data

US 2010/0316899 A1    Dec. 16, 2010

Related U.S. Application Data

(63) Continuation of application No. 11/560,512, filed on Nov. 16, 2006, now Pat. No. 7,794,868.

(30) Foreign Application Priority Data

Dec. 2, 2005 (KR) .................. 10-2005-0116657

(51) Int. Cl.
H01M 10/50 (2006.01)
H01M 6/42 (2006.01)

(52) U.S. Cl. ............... 429/120; 429/156; 429/159

(58) Field of Classification Search ........... 429/120, 429/156

See application file for complete search history.

(56) References Cited

U.S. PATENT DOCUMENTS

| 2,273,244 | A | 2/1942 | Ambruster |
|---|---|---|---|
| 3,503,558 | A | 3/1970 | Galiulo et al. |
| 3,522,100 | A | 7/1970 | Lindstrom |
| 5,071,652 | A | 12/1991 | Jones et al. |
| 5,270,131 | A | 12/1993 | Diethelm et al. |
| 5,346,786 | A | 9/1994 | Hodgetts |
| 5,354,630 | A | 10/1994 | Earl et al. |
| 5,385,793 | A | 1/1995 | Tiedemann et al. |
| 5,487,958 | A | 1/1996 | Tura |
| 5,510,203 | A | 4/1996 | Hamada et al. |

(Continued)

FOREIGN PATENT DOCUMENTS

CN    1512518 A    7/2004

(Continued)

OTHER PUBLICATIONS

Chinese Office Action dated Dec. 7, 2007 for Chinese Patent Application No. 200480025941.5 (PCT/KR2004/002399).

(Continued)

Primary Examiner — Edward Tso
Assistant Examiner — Ahmed Omar
(74) Attorney, Agent, or Firm — Cantor Colburn LLP

(57) ABSTRACT

Disclosed herein is a battery module including a plurality of unit cells stacked one on another. The battery module has a cooling system that accomplishes contact type cooling by a coolant flowing through gaps (flow channels) defined between the unit cells, and the flow channels defined between the unit cells are at a predetermined angle to the flowing direction of the coolant at inlet ports of the flow channels. The contact rate of the coolant to the unit cells in the battery module is increased and a large number of turbulent flows are created by the changing the flow channel through which the coolant flows. Consequently, the occurrence of the velocity gradient of the coolant in the flow channel defined between the unit cells is prevented, and therefore, the cooling efficiency of the battery module is improved.

7 Claims, 5 Drawing Sheets

U.S. PATENT DOCUMENTS

| | | | |
|---|---|---|---|
| 5,520,976 | A | 5/1996 | Giannetti et al. |
| 5,561,005 | A | 10/1996 | Omaru et al. |
| 5,589,290 | A | 12/1996 | Klink et al. |
| 5,663,007 | A | 9/1997 | Ikoma et al. |
| 5,693,432 | A | 12/1997 | Matsumoto |
| 5,756,227 | A | 5/1998 | Suzuki et al. |
| 6,099,986 | A | 8/2000 | Gauthier et al. |
| 6,117,584 | A | 9/2000 | Hoffman et al. |
| 6,121,752 | A | 9/2000 | Kitahara et al. |
| 6,257,328 | B1 | 7/2001 | Fujiwara et al. |
| 6,406,812 | B1 | 6/2002 | Dreulle et al. |
| 6,413,678 | B1 | 7/2002 | Hamamoto et al. |
| 6,422,027 | B1 | 7/2002 | Coates, Jr. et al. |
| 6,448,741 | B1 | 9/2002 | Inui et al. |
| 6,462,949 | B1 | 10/2002 | Parish, IV et al. |
| 6,475,659 | B1 | 11/2002 | Heimer |
| 6,709,783 | B2 | 3/2004 | Ogata et al. |
| 6,771,502 | B2 | 8/2004 | Getz, Jr. et al. |
| 6,780,538 | B2 | 8/2004 | Hamada et al. |
| 6,821,671 | B2 | 11/2004 | Hinton et al. |
| 6,886,249 | B2 | 5/2005 | Smalc |
| 6,982,131 | B1 | 1/2006 | Hamada et al. |
| 7,026,073 | B2 | 4/2006 | Ueda et al. |
| 7,147,045 | B2 | 12/2006 | Quisenberry et al. |
| 7,229,327 | B2 | 6/2007 | Zhao et al. |
| 7,251,889 | B2 | 8/2007 | Kroliczek et al. |
| 7,264,902 | B2 | 9/2007 | Horie et al. |
| 7,479,758 | B2 | 1/2009 | Moon |
| 2001/0046624 | A1 | 11/2001 | Goto et al. |
| 2003/0082440 | A1 | 5/2003 | Mrotek et al. |
| 2004/0021442 | A1 | 2/2004 | Higashino |
| 2004/0036444 | A1 | 2/2004 | Oogami |
| 2005/0026014 | A1 | 2/2005 | Fogaing et al. |
| 2005/0100783 | A1* | 5/2005 | Ro et al. .................. 429/159 |
| 2005/0134038 | A1 | 6/2005 | Walsh |
| 2005/0287426 | A1 | 12/2005 | Kim et al. |
| 2006/0093901 | A1 | 5/2006 | Lee et al. |
| 2007/0037051 | A1 | 2/2007 | Kim et al. |
| 2007/0081356 | A1* | 4/2007 | Lee et al. .................. 362/561 |
| 2007/0126396 | A1 | 6/2007 | Yang |
| 2009/0186265 | A1 | 7/2009 | Koetting et al. |
| 2009/0229239 | A1 | 9/2009 | Keller et al. |
| 2009/0325051 | A1 | 12/2009 | Niedzwiecki et al. |
| 2009/0325052 | A1 | 12/2009 | Koetting et al. |
| 2009/0325053 | A1 | 12/2009 | Koetting et al. |
| 2009/0325054 | A1 | 12/2009 | Payne et al. |
| 2009/0325055 | A1 | 12/2009 | Koetting et al. |
| 2009/0325059 | A1 | 12/2009 | Niedzwiecki et al. |

FOREIGN PATENT DOCUMENTS

| | | | |
|---|---|---|---|
| EP | 0736226 | B1 | 3/1999 |
| EP | 0673553 | B1 | 2/2001 |
| EP | 1435675 | A1 | 7/2004 |
| JP | 4056079 | A | 2/1992 |
| JP | 8138735 | A | 5/1996 |
| JP | 8222280 | A | 8/1996 |
| JP | 9129213 | A | 5/1997 |
| JP | 09-219213 | | 8/1997 |
| JP | 9298070 | A1 | 11/1997 |
| JP | 10199510 | A | 7/1998 |
| JP | 11066949 | A | 3/1999 |
| JP | 11191432 | A | 7/1999 |
| JP | 2000067934 | A * | 3/2000 |
| JP | 2001167803 | A | 6/2001 |
| JP | 2003219572 | A | 7/2003 |
| JP | 2005-126315 | | 5/2005 |
| JP | 2008-080995 | | 4/2008 |
| KR | 1020060072922 | | 6/2006 |
| KR | 100765659 | B1 | 10/2007 |
| KR | 100889241 | B1 | 3/2009 |
| KR | 100921346 | B1 | 10/2009 |
| WO | WO03/071616 | A2 | 8/2003 |
| WO | WO2009/151192 | A1 | 12/2009 |

OTHER PUBLICATIONS

European Supplementary Search Report dated Aug. 28, 2009 for EP Application No. 04774658.
International Search Report for PCT/KR2009/000258 dated Aug. 28, 2009.
International Search Report for international application No. PCT/KR2006/004583 dated Feb. 6, 2007.
International Search report for PCT/KR2009/003434 dated Jan. 18, 2010.
Machine translation of JP 08-138735, May 31, 1996.
Machine translation of JP 10-199510, Jul. 31, 1998.
Machine translation of JP 2000 260469, Sep. 22, 2000.
U.S. Appl. No. 12/246,073, filed Oct. 6, 2008 entitled Battery Cell Assembly and Method for Assembling the Battery Cell Assembly.
U.S. Appl. No. 12/426,795, filed Apr. 20, 2009 entitled Frame Member, Frame Assembly and Battery Cell Assembly Made Therefrom and Methods of Making the Same.
U.S. Appl. No. 12/433,155, filed Apr. 30, 2009 entitled Cooling System for a Battery System and a Method for Cooling the Battery System.
U.S. Appl. No. 12/433,397, filed Apr. 30, 2009 entitled Battery Systems, Battery Modules, and Method for Cooling a Battery Module.
U.S. Appl. No. 12/433,427, filed Apr. 30, 2009 entitled Cooling Manifold and Method for Manufacturing the Cooling Manifold.
U.S. Appl. No. 12/433,485, filed Apr. 30, 2009 entitled Battery Systems, Battery Module, and Method for Cooling the Battery Module.
U.S. Appl. No. 12/433,534, filed Apr. 30, 2009 entitled Battery Systems, Battery Modules, and Method for Cooling a Battery Module.
U.S. Appl. No. 12/511,530, filed Jul. 29, 2009 entitled Battery Module and Method for Cooling the Battery Module.
U.S. Appl. No. 12/511,552, filed Jul. 29, 2009 entitled Battery Module and Method for Cooling the Battery Module.
U.S. Appl. No. 12/549,766, filed Aug. 28, 2009 entitled Battery Module and Method for Cooling the Battery Module.

* cited by examiner

Prior Art

BATTERY MODULE OF HIGH COOLING EFFICIENCY

CROSS REFERENCE TO RELATED APPLICATIONS

This application is a continuation of pending U.S. patent application Ser. No. 11/560,512, filed on Nov. 16, 2006, the contents of which are incorporated herein by reference in its entirety.

FIELD OF THE INVENTION

The present invention relates to a battery module having high cooling efficiency, and, more particularly, to a battery module having a cooling system for cooling a plurality of unit cells by a coolant flowing between the unit cells, wherein flow channels, through which the coolant flows between the unit cells, are at a predetermined angle to an inlet ports of the flow channels, whereby the contact rate of the coolant to the surfaces of the unit cells is increased, the turbulent flow generating rate in the coolant flow channels is increased, and therefore, the battery module has high cooling efficiency under the same conditions.

BACKGROUND OF THE INVENTION

One of the biggest problems caused from vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). For this reason, a plurality of small-sized secondary batteries (unit cells) are connected in series or in parallel with each other so as to construct a medium- or large-sized battery pack.

However, a large amount of heat is generated from the medium- or large-sized battery pack during the charge and the discharge of the battery pack. Most of the heat is generated from the secondary batteries, which are the unit cells of the medium- or large-sized battery pack. When the heat generated from the unit cells during the charge and the discharge of the battery pack is not effectively removed, heat is accumulated in the battery pack with the result that the unit cells are degraded. According to circumstances, the unit cells may catch fire or explode. Consequently, it is necessary to provide a cooling system for preventing the catching fire or explosion of the unit cells.

The cooling system is constructed in a structure in which a coolant is forcibly circulated through the interior of the battery pack so as to remove heat from the unit cells, i.e., in a contact type cooling structure in which the coolant is brought into contact with the surfaces of the unit cells constituting the battery pack. Air is mainly used as the coolant. Consequently, the cooling system is generally constructed in a contact type air cooling structure.

Meanwhile, prismatic batteries or pouch-shaped batteries, which can be stacked one on another to reduce the size of a dead space, are used as the unit cells. In order to easily accomplish the mechanical coupling and the electrical connection between the unit cells, a cartridge, in which one or more unit cells are mounted, is used. And a plurality of cartridges, in which the unit cells are mounted, are stacked one on another so construct a battery pack.

The cartridge may have various shapes. In addition, the cartridge may be constructed in a structure in which the unit cells are fixed to a frame member while most of the outer surfaces of the unit cells are open. An example of such a cartridge is disclosed in Korean Patent Application No. 2004-111699, which has been filed in the name of the applicant of the present patent application. FIG. 1 illustrates the cartridge disclosed in the above-mentioned application.

Referring first to FIG. 1, a cartridge 100 comprises a pair of frame members 120 and 122, which are coupled with each other. Unit cells 200 and 201 are located in cell partitions 130 of the frame members 120 and 122 while the frame members 120 and 122 are separated from each other, and are then securely fixed at the cell partitions 130 of the frame members 120 and 122 after the frame members 120 and 122 are coupled with each other. The unit cell 200 has an electrode lead (not shown), which is electrically connected to that of the neighboring unit cell 201 via a bus bar 140 located at the upper part of the cartridge 100. As shown in FIG. 1, the unit cells 200 and 201 are connected in series with each other. According to circumstances, however, the unit cells may be connected in parallel with each other. The unit cells are electrically connected to a cathode terminal 150 and an anode terminal 160, which protrude from opposite sides of the upper end of the cartridge 100, respectively.

FIG. 2 is a perspective view illustrating a battery module constructed by stacking a plurality of battery cartridges one on another in an alternating orientation structure.

Referring to FIG. 2, a plurality of cartridges 101, 102, 103 . . . are stacked one on another in the thickness direction so as to construct a battery module 300. To easily accomplish the electrical connection between the terminals of the cartridges, the second cartridge 102 is stacked on the first cartridge 101 while the second cartridge 102 is oriented in the direction opposite to the orientation direction of the first cartridge 101. Specifically, the first cartridge 101 and the second cartridge 102 are arranged such that a cathode terminal 152 and an anode terminal 162 of the second cartridge 102 are opposite to a cathode terminal 151 and an anode terminal 161 of the first cartridge 101. Similarly, the second cartridge 102 and the third cartridge 103 are arranged such that a cathode terminal 153 and an anode terminal 163 of the third cartridge 103 are opposite to the cathode terminal 152 and the anode terminal 162 of the second cartridge 102. That is to say, the third cartridge 103 is arranged in the same orientation as the first cartridge 101.

As shown in FIG. 1, the height of an upper end frame 110 and a lower end frame 112 of the cartridge 100 is less than that of side frames 11 of the cartridge. Consequently, when the cartridges 101, 102, 103 . . . are stacked one on another as shown in FIG. 2, flow channels 170, 171, 172, and 173 are formed in spaces defined between the upper ends of the cartridges 101, 102, 103 . . . and the lower ends of the neighboring cartridges. As a result, a coolant flows in the direction indicated by an arrow.

FIG. 3 is a typical view illustrating the flow of a coolant through the flow channel defined between the battery cartridges of the battery module shown in FIG. 2, and FIG. 4 is an enlarged view illustrating part A of FIG. 3.

Referring to FIG. 3, the flow channel 170, which was described above with reference to FIG. 2, is formed between the first cartridge 101 and the second cartridge 102. The respective cartridges 101 and 102 are constructed in a frame structure in which the outer surfaces of the unit cells are almost fully exposed as shown in FIG. 1. As a result, the coolant flowing through the flow channel 170 is brought into direct contact with the outer surfaces of the unit cells (not shown). Consequently, the coolant takes heat generated from the unit cells, while the coolant flows through the flow channel 170, and then discharges the heat out of the battery module.

As shown in FIG. 4, however, when viewing from a microscopic viewpoint, the coolant flowing through the flow channel 170 has a velocity gradient in the hydrodynamic aspect. Specifically, the flow velocity of the coolant flowing through the flow channel while being near to the surface of the unit cell 200 is less than that of the coolant flowing through the flow channel while being spaced apart from the surface of the unit cell 200. This velocity gradient is a factor that greatly reduces the efficiency when heat is removed from the outer surface of the unit cell 200, i.e., the heat removing efficiency.

Consequently, the necessity of a technology for improving the cooling efficiency by solving the velocity gradient is very high in consideration of the fact that the coolant-circulating cooling system is principally based on a contact type cooling reaction mechanism.

One of methods of improving the cooling efficiency may be a method of increasing the flow speed of the coolant to increase the flow rate of the coolant adjacent to the unit cells per hour. However, this method is not preferable in that larger cooling fan or stronger fan driving unit is necessary.

SUMMARY OF THE INVENTION

Therefore, the present invention has been made to solve the above-mentioned problems, and other technical problems that have yet to be resolved.

Specifically, it is an object of the present invention to provide a battery module using a coolant contact type cooling system in which the contact rate of a coolant to the surfaces of unit cells is increased, and the turbulent flow generating rate in coolant flow channels is increased, whereby the battery module has the high cooling efficiency under the same conditions.

In accordance with one aspect of the present invention, the above and other objects can be accomplished by the provision of a battery module including a plurality of unit cells stacked one on another, wherein the battery module has a cooling system that accomplishes contact type cooling by a coolant flowing through gaps (flow channels) defined between the unit cells, and the flow channels defined between the unit cells are at a predetermined angle to the flowing direction of the coolant at inlet ports of the flow channels.

In the contact type cooling system according to the present invention, as previously described, the coolant takes heat generated from the unit cells while the coolant flows through the flow channels defined between the unit cells. The coolant flow channels are decided based on in what shape the unit cells are spaced apart from each other. According to the present invention, the flow channels defined between the unit cells are at a predetermined angle to the flowing direction of the coolant at inlet ports of the flow channels. Consequently, after the coolant is introduced through the flow channel inlet ports, and the flow direction of the coolant is inclined while the coolant flows along the flow channels defined between the unit cells. At this time, turbulent flows occur, and therefore, the sectional velocity gradient is prevented. As a result, the contact rate of the coolant to the unit cells is increased, and therefore, the cooling efficiency of the battery module is improved.

The predetermined angle may be changed depending upon the flow speed of the coolant, the size of the gaps defined between the unit cells, or desired cooling degree. The predetermined angle may be, preferably, between 2 and 30 degrees, more preferably, between 3 and 15 degrees. When the inclination angle is too small, it is difficult to accomplish desired effects. When the inclination angle is too large, on the other hand, the flow resistance is increased, and therefore, the flow speed of the coolant is greatly decreased, which is not preferable.

The coolant is not particularly restricted so long as the coolant is a fluid that can flow through the flow channels and can remove heat from the unit cells. Preferably, the coolant is air.

A driving unit used to flow the coolant may be changed depending upon kinds of coolant. In the case that the coolant is the air, the driving unit may be preferably a cooling fan driven by a motor.

The term used in the specification "battery module" inclusively means the structure of a battery system constructed by mechanically coupling and, at the same time, electrically connecting two or more unit cells so as to provide high-output and large-capacity power. Specifically, the battery module may construct either the entirety of a device or a part of a large-sized device. For example, a plurality of battery modules may be connected with each other so as to construct a battery pack.

The unit cells may be secondary batteries that can be charged and discharged. Typically, the unit cells may be nickel metal hydride secondary batteries, lithium-ion secondary batteries, or lithium-ion polymer secondary batteries. Among them, the lithium-ion secondary batteries are preferably used because the lithium-ion secondary batteries have high energy density and high discharge voltage. In terms of the shape of the unit cells, prismatic batteries or pouch-type batteries are preferably used. More preferably, the pouch-shaped batteries are used because the manufacturing costs of the pouch-shaped batteries are low, and the weight of the pouch-shaped batteries small.

The unit cells may be stacked one on another without using additional members so as to construct a battery module. Preferably, however, one or more unit cells are mounted in a cartridge such that the outer surfaces of the unit cells are almost fully exposed to the outside, and a plurality of cartridges are stacked one on another to construct a battery module. Especially, when the pouch-shaped batteries, which have low mechanical strength and in which the electrical connection between electrode terminals of the batteries is difficult, are used as the unit cells, it is preferable that the pouch-shaped batteries be mounted in the cartridge so as to construct a battery module.

The cartridge may have various different structures. In a preferred embodiment, the cartridge includes a pair of rectangular frame members for fixing the edges of the unit cells such that the upper and lower surfaces of the unit cells are exposed to the outside when the rectangular frame members are coupled with each other, one or more plate-shaped unit cells are mounted between the frame members while the unit cells are arranged in the lateral direction, bus bars for connecting electrode terminals of the unit cells are attached to upper end frames, and side frames of the cartridge have a height greater than that of upper and lower frames and the thickness of the unit cells when the unit cells are mounted in the cartridge.

The fundamental structure of the cartridge is nearly identical to that of a cartridge disclosed in Korean Patent Application No. 2004-111699, which has been filed in the name of the applicant of the present application. The disclosure of the above-mentioned Korean patent application is hereby incorporated by reference as if fully set forth herein.

When a plurality of cartridges, in which the unit cells are mounted, are sequentially stacked one on another to construct a battery module, and continuous flow channels are formed between the upper and lower end frames of the neighboring cartridges and between the upper and lower surfaces of the unit cells facing each other. The gap defined between the upper end frames of two neighboring cartridges constitutes a flow channel inlet port.

According to the present invention, the flow channels defined between the unit cells are at the predetermined angle to the flowing direction of the coolant at the flow channel inlet ports. As a result, the cartridge is constructed in a structure in which the side frames are at the predetermined angle to the upper frames. Consequently, the coolant introduced through the flow channel inlet ports of the upper end frames, which are disposed in the horizontal direction, flows through the flow channels on the upper frames in the horizontal direction. When the coolant flows through the flow channels defined between the unit cells, which are inclined at the same inclination angle as the side frames, however, the flow direction of the coolant is also inclined.

In a preferred embodiment, the lower end frame of each cartridge is inclined at the same angle as the upper frame of each cartridge. Consequently, it is possible to more easily accomplish the stacking process of the cartridges.

In accordance with another aspect of the present invention, there is provided a medium- or large-sized battery pack including one or more battery modules with the above-stated construction. The medium- or large-sized battery pack further includes a battery management system (BMS) for controlling the operation of the battery modules in addition to the battery modules.

The medium- or large-sized battery pack according to the present invention has high cooling efficiency. Consequently, the present invention is more preferably applied to a battery pack using lithium secondary batteries having a large amount of heat generation as unit cells. Although the size of the battery pack is small, the battery pack according to the present invention provides high cooling efficiency. Consequently, the battery pack is preferably used as a compact power source for electric vehicles, hybrid electric vehicles, or electric bicycles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 5:
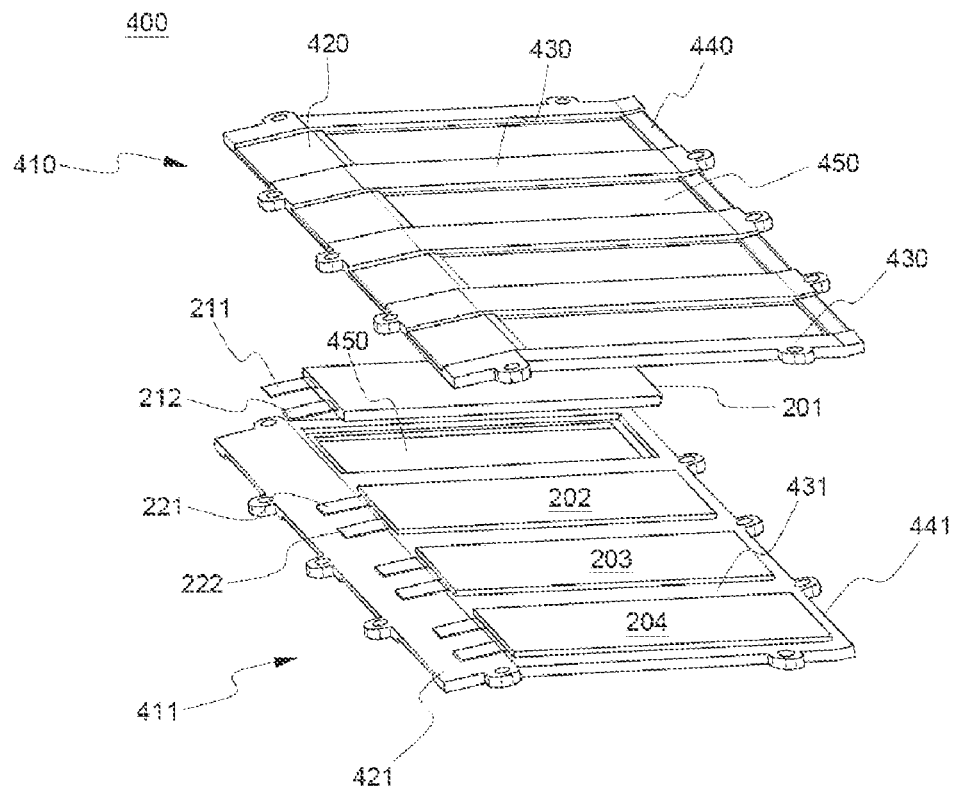
FIG. 5 is a typical view illustrating a process for mounting unit cells in a battery cartridge that can be used to construct a battery module according to a preferred embodiment of the present invention.
Figure 6:
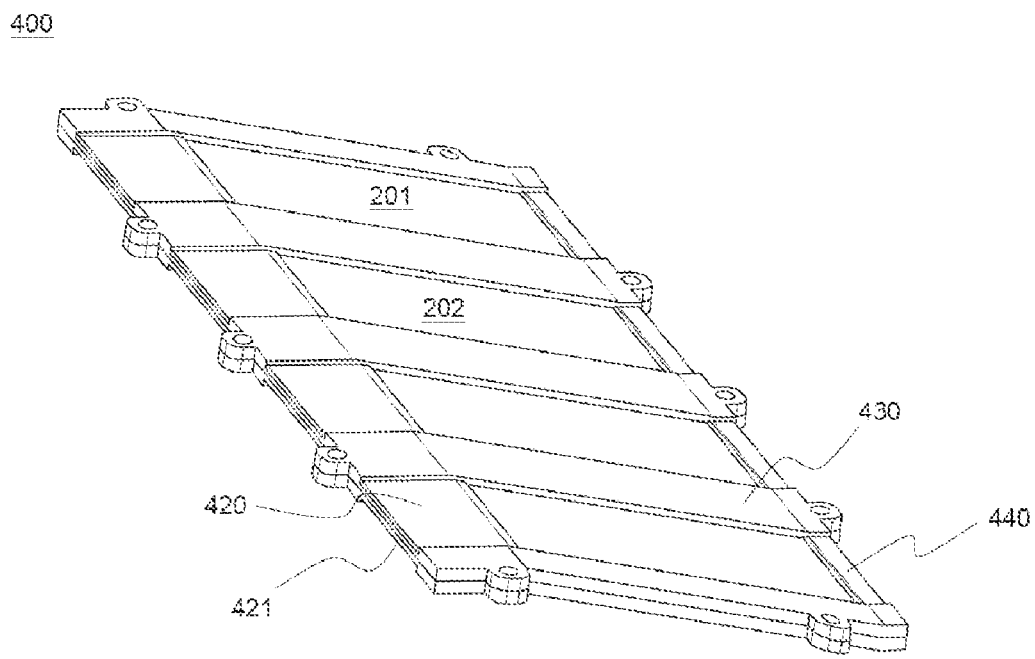
FIG. 6 is a perspective view illustrating the battery cartridge of FIG. 5 having the unit cells mounted therein.

FIG. 5 is a typical view illustrating a process for mounting unit cells in a battery cartridge that can be used to construct a battery module according to a preferred embodiment of the present invention, and FIG. 6 is a perspective view typically illustrating the battery cartridge, in which the unit cells are mounted therein.

Figure 1:
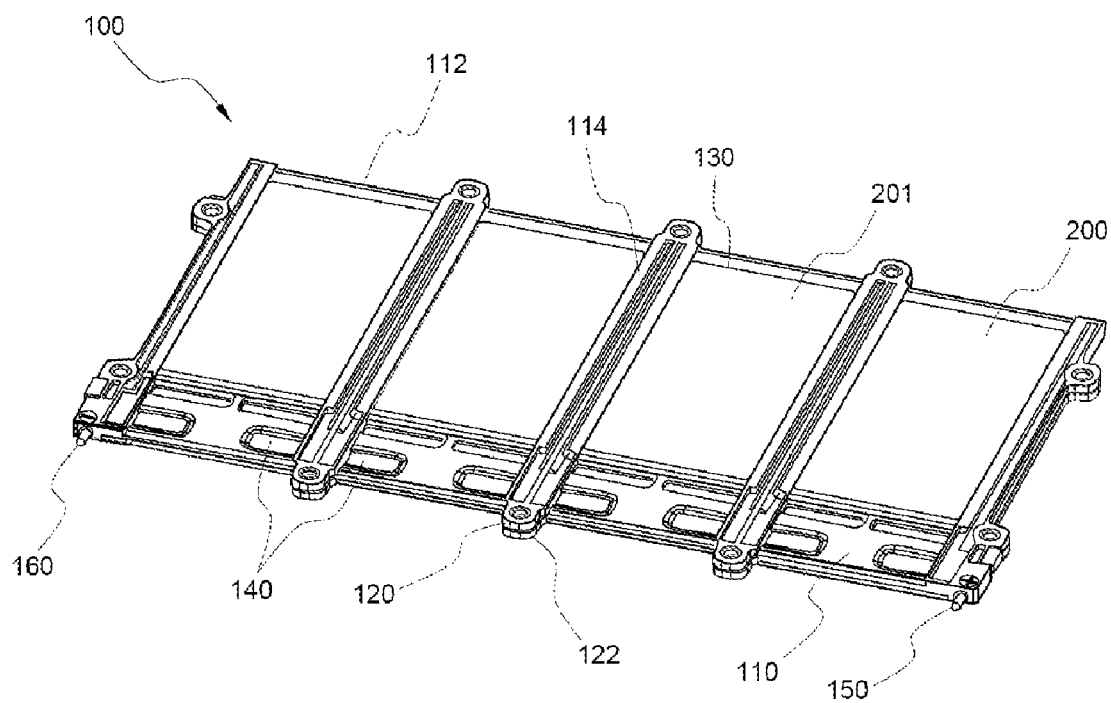
FIG. 1 is a perspective view illustrating a conventional battery cartridge.

Referring to these drawings, a battery cartridge 400 is very similar or identical in the basic structure to the battery cartridge 100 of FIG. 1. Specifically, a plurality of plate-shaped unit cells 201, 202, 203, 204 are mounted between a pair of coupling type upper and lower frame members 410 and 411 such that the unit cells are arranged in lateral direction.

The unit cells 201, 202 . . . are pouch-shaped batteries. Electrode terminals 211, 221, 212, 222 . . . protrude from the upper ends of the unit cells 201, 202 . . . . The electrode terminals 211, 221, 212, 222 . . . are electrically connected with the corresponding ones by bus bars (not shown) attached to either an upper end frame 420 of the upper frame member 410 or an upper end frame 421 of the lower frame member 411.

After the unit cells 201, 202 . . . are mounted between the upper frame member 410 and the lower frame member 411, the upper frame member 410 and the lower frame member 411 are brought into tight contact with each other, and then are coupled with each other. As a result, the upper frame member 410 and the lower frame member 411 have a symmetrical structure. Consequently, the description of the structure of the upper frame member 410 is almost equally applied to the lower frame member 411.

The upper frame member 410 is generally constructed in a rectangular structure. The upper frame member 410 includes an upper frame 420, a lower frame 440, and a plurality of side frames 430. The edges of the unit cells 201, 202 . . . are fixed by the contact regions of the upper and lower frame members 410 and 411, i.e., the upper end frames 420 and 421, the side frames 430 and 432, and the lower end frames 440 and 441. In addition, the upper and lower surfaces of the unit cells 201 and 202 are exposed to the outside through openings 450.

Figure 7:
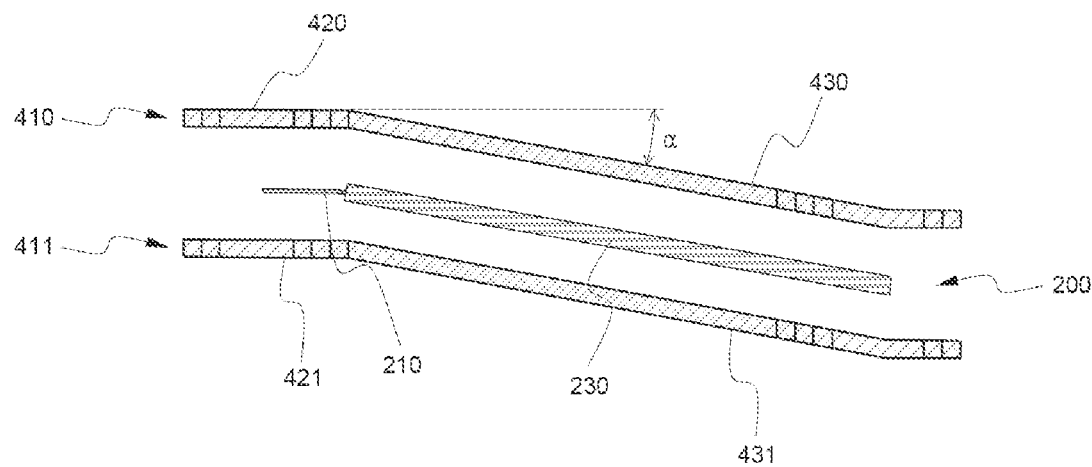
FIG. 7 is a side view typically illustrating inclined frame members of the battery cartridge shown in FIG. 6 and the unit cell mounted between the inclined frame members.

The side frames 430 and 431 are at a predetermined angle to the upper end frames 402 and 421, respectively, and the lower end frames 440 and 441 are in parallel with the upper end frames 420 and 421, respectively. This structure is shown in more detail in FIG. 7. Referring to FIG. 7, the side frames 430 and 431 are at an angle of α to the upper end frames 420 and 421, respectively. Consequently, electrode terminals 210 of the unit cell 200, which are coupled to the upper end frames 420 and 421, are in parallel with the upper end frames 420 and 421, like the upper end frames 420 and 421, whereas the cell body 230 of the unit cell 200 is at the predetermined angle to the upper end frames 420 and 421, like the side frames 430 and 431.

Referring back to FIGS. 5 and 6, the protruding height of the side frames 430 and 431 is greater than that of the upper and lower end frames 420, 421, 430, and 431, and the protruding height of the side frames 430 and 431 is greater than the thickness of the unit cells 201, 202 . . . mounted between the side frames 430 and 431.

Figure 2:
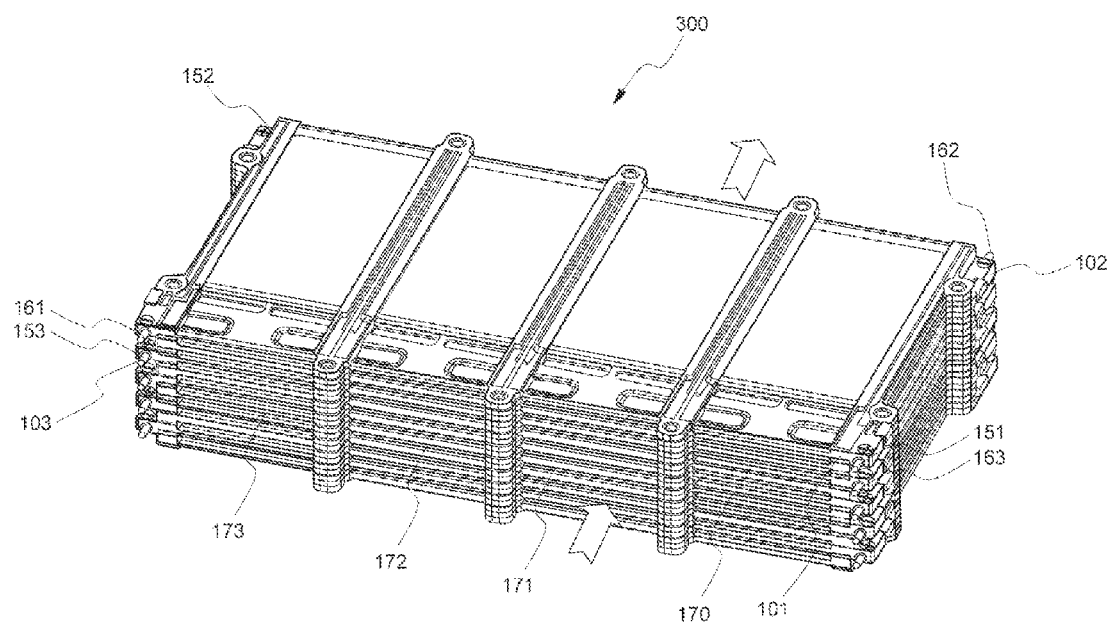
FIG. 2 is a perspective view illustrating a battery module constructed by stacking a plurality of battery cartridges, one of which is shown in FIG. 1, one on another.
Figure 3:
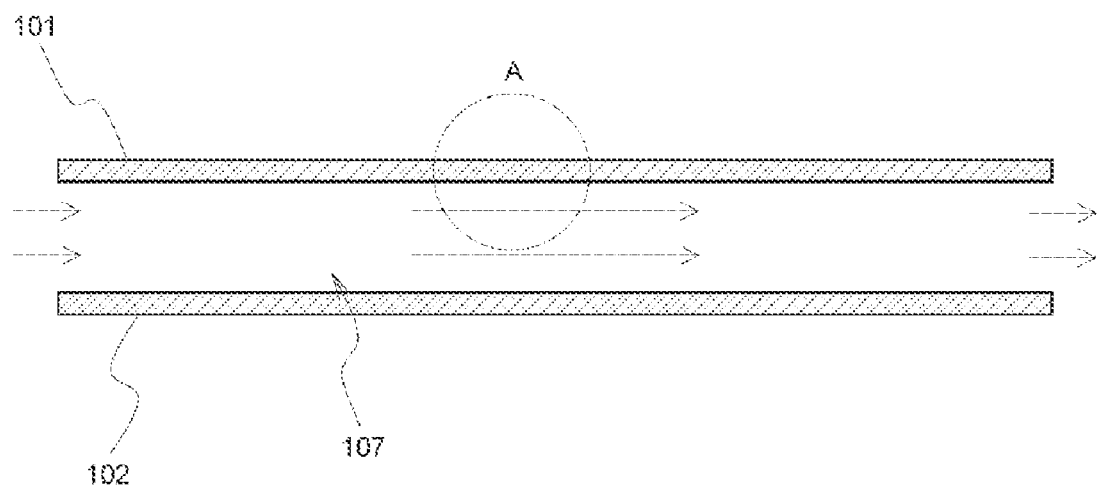
FIG. 3 is a typical view illustrating the flow of a coolant through a flow channel defined between the battery cartridges of the battery module shown in FIG. 2.

Consequently, when a plurality of cartridges 400 (see FIG. 6), in which the unit cells are mounted, are stacked one on another as shown in FIG. 2, the cartridges are arranged such that the side frames are in contact with each other, and therefore, gaps are defined along the upper end frames, the unit cells, and the lower end frames. The gaps constitute flow channels through which a coolant flows.

Figure 8:
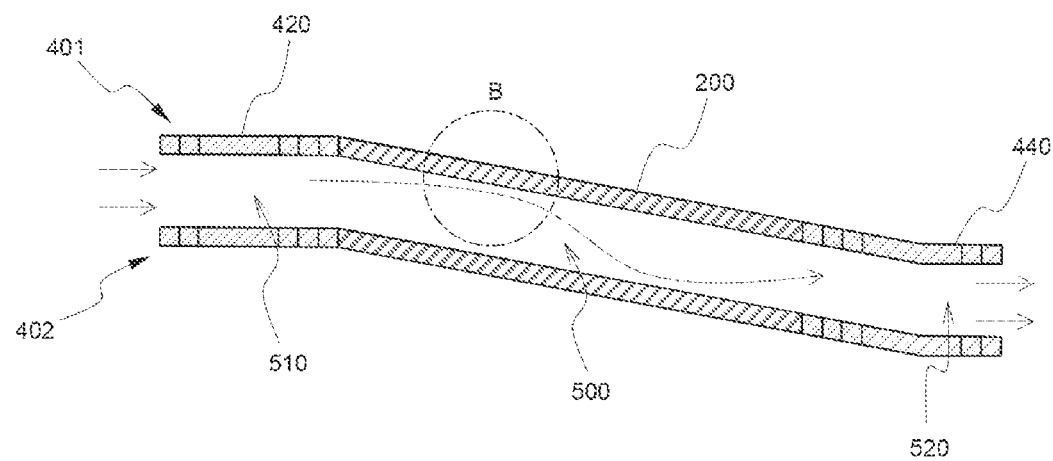
FIG. 8 is a typical view illustrating a flow channel defined between the battery cartridges of the battery module according to the preferred embodiment of the present invention and the flow of a coolant through the flow channel.

FIG. 8 is a typical view illustrating a flow channel defined between the battery cartridges of the battery module according to the preferred embodiment of the present invention and the flow of a coolant through the flow channel.

Referring to FIG. 8, a flow channel 500 is formed between two cartridges 401 and 402, which are stacked one on another. The flow channel 500 is slightly inclined by the above-described structure of the cartridges. A flow channel inlet port 510 formed between the upper end frames 410 is disposed in the horizontal direction, and the flow channel 500 formed between the unit cells 200 is at the predetermined angle to the flow channel inlet port 510. Consequently, a coolant flows in the horizontal direction while the coolant passes through the flow channel inlet port 510. After the coolant is introduced into the flow channel 500, however, the coolant flows in an "S" shape as indicated by an arrow. When the coolant is introduced into a flow channel outlet port 520 between the lower end frames 440, the coolant flows again in the horizontal direction.

Figure 9:
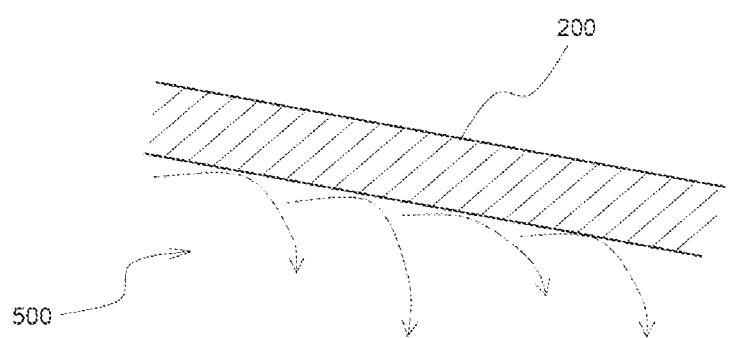
FIG. 9 is an enlarged view illustrating part B of FIG. 8.

FIG. 9 is an enlarged view illustrating part B of FIG. 8.

Figure 4:
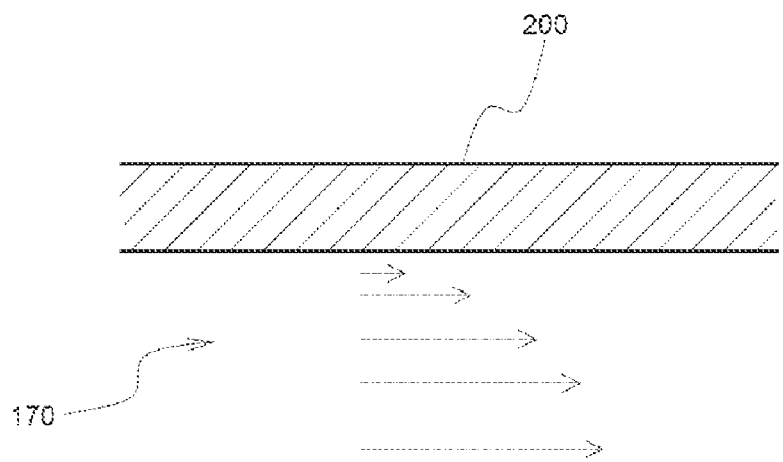
FIG. 4 is an enlarged view illustrating part A of FIG. 3.

Referring to FIG. 9, the S-shaped flow of the coolant through the flow channel 500 describes a parabolic motion when viewing from a microscopic viewpoint. This is because the coolant introduced into the flow channel inlet port in the horizontal direction collides with the inclined unit cell 200. Consequently, the contact rate of the coolant to the unit cell is increased, and a large number of turbulent flows are created, which prevents the occurrence of the velocity gradient as shown in FIG. 4. As a result, the cooling efficiency of the unit cell 200 by the coolant is greatly improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the contact rate of the coolant to the unit cells in the battery module according to the present invention is increased and a large number of turbulent flows are created by the changing the flow channel through which the coolant flows. Consequently, the occurrence of the velocity gradient of the coolant in the flow channel defined between the unit cells is prevented, and therefore, the cooling efficiency of the battery module is improved.

Furthermore, a battery pack including the battery module has high cooling efficiency although the overall structure of the battery pack is not greatly changed, or a large-sized cooling fan or a powerful driving unit is not used. Consequently, the battery pack is preferably used as a power source for electric vehicles or hybrid electric vehicles.

I claim:

1. A battery module comprising:
   first and second frame members;
   a first unit cell disposed between the first and second frame members and supported by the first and second frame members;
   third and fourth frame members, the third frame member being disposed on the second frame member;
   a second unit cell disposed between the third and fourth frame members and supported by the third and fourth frame members;
   the first and second unit cells having a flow channel defined therebetween, the first and second unit cells being longitudinally positioned at a first predetermined angle between 3 and 15 degrees relative to an input port defined by the second and third frame members, and the first and second unit cells being further longitudinally positioned at a second predetermined angle between 3 and 15 degrees relative to an outlet port defined by the second and third frame members, the inlet port extending in a direction parallel to a direction in which the outlet port extends; and
   a cooling system that routes coolant through the input port and the flow channel such that the coolant contacts the first and second unit cells to cool the first and second unit cells,
   wherein the first frame member includes a first side frame coupled to a first upper frame and a first lower frame, the first side frame having a first protruding height greater than a height of the first upper frame and a height of the first lower frame, and
   the second frame member includes a second side frame coupled to a second upper frame and a second lower frame, the second side frame having a second protruding height greater than a height of the second upper frame and a height of the second lower frame, and the first and second protruding heights being greater than a thickness of the first unit cell when the first unit cell is mounted between the first and second frame members.

2. The battery module according to claim 1, wherein the coolant is air.

3. The battery module according to claim 1, wherein the unit cells are lithium secondary batteries.

4. The battery module according to claim 1, wherein the unit cells are pouch-shaped batteries.

5. The battery module according to claim 1, wherein bus bars for connecting electrode terminals of the unit cells are attached to at least one of the first and second frame members.

6. A medium- or large-sized battery pack including one or more battery modules according to claim 2.

7. The battery pack according to claim 6, wherein the battery pack is used as a power source for electric vehicles or hybrid electric vehicles.

* * * * *